United States Patent [19]

Cornu

[11] 4,269,272

[45] May 26, 1981

[54] MACHINE FOR PULLING ENDIVES AND OTHER TAP ROOTS

[76] Inventor: Dominique Cornu, 1411 Chaneaz, Switzerland

[21] Appl. No.: 45,690

[22] PCT Filed: Jun. 5, 1979

[86] PCT No.: PCT/CH78/00028

§ 371 Date: Jun. 5, 1979

§ 102(e) Date: Jun. 5, 1979

[87] PCT Pub. No.: WO79/00191

PCT Pub. Date: Apr. 19, 1979

[30] Foreign Application Priority Data

Oct. 7, 1977 [CH] Switzerland .............. 12284/77

[51] Int. Cl.³ .................. A01D 19/10; A01D 25/04
[52] U.S. Cl. .............................. 171/116; 171/58; 171/85
[58] Field of Search .............. 171/12, 25, 58, 115, 171/116, 111, 114, 101, 85

[56] References Cited

U.S. PATENT DOCUMENTS

| 791,707 | 6/1905 | Louett | 171/116 |
|---|---|---|---|
| 879,543 | 2/1908 | Herberg | 171/116 |
| 1,761,286 | 6/1930 | Zuckerman | 171/116 |
| 2,462,128 | 2/1949 | Roach et al. | 171/116 |
| 2,722,794 | 11/1955 | McGee | 171/101 |
| 2,876,849 | 3/1959 | Hustad | 171/115 |
| 2,993,545 | 7/1961 | Hammer et al. | 171/58 |
| 2,997,114 | 8/1961 | Hines | 171/116 |
| 3,139,938 | 7/1964 | Parrish et al. | 171/58 |

FOREIGN PATENT DOCUMENTS 19851 2/1915 Denmark ................ 171/116

Primary Examiner—Paul J. Hirsch
Attorney, Agent, or Firm—Robert E. Burns; Emmanuel J. Lobato; Bruce L. Adams

[57] ABSTRACT

A mobile endive-harvesting machine has a fixed but position-adjustable uprooting plowshare and a spoked wheel disposed in front of a conveyor. The machine has an uprooting unit consisting of the spoked wheel which is driven at a speed greater than the travelling speed of the machine, and a disc disposed alongside the wheel and rearwardly and transversely spaced relative to the plowshare. The disc and spoked wheel define between them a vertical V.

16 Claims, 4 Drawing Figures

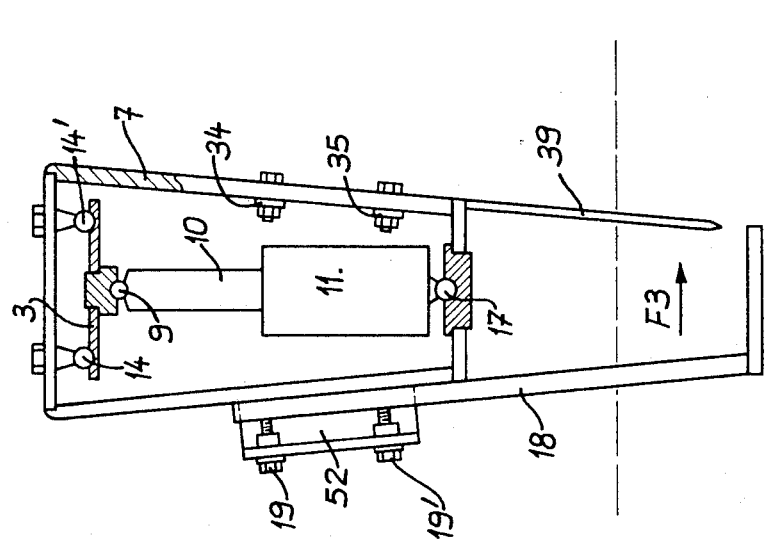
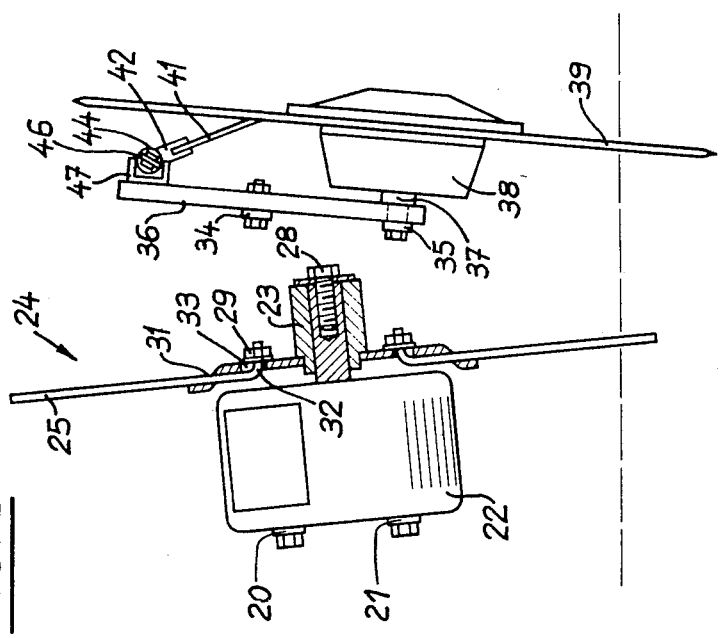

MACHINE FOR PULLING ENDIVES AND OTHER TAP ROOTS

FIELD OF INVENTION

This invention relates to a machine for uprooting endives and other tap roots such for example as Viper's grass and beetroot, which apparatus is mobile and on which is mounted at least one uprooting plowshare with a conveyor belt rearwardly thereof.

BACKGROUND OF THE INVENTION

Insofar as the uprooting of endives is concerned, it is essential that the endive, which must be re-planted, is not damaged whilst being uprooted and that all soil around it is removed as quickly as possible. Existing machines, which incorporate U-shaped plowshares with two vertical or slightly inclined parts joined to a frame, have the disadvantage of exerting a strong compression force on the soil during uprooting of the endive root. Because of this compression, the soil does not break down while the endive root is on the conveyor belt and the endives arrive at a trailer covered with soil which hardens and is difficult to remove. Moreover, the transfer of soil to the trailer means a loss of soil from the ground and also a useless overloading of the trailer. Furthermore, the endive roots are often damaged by the existing plowshares. A further problem, is that in certain instances plots of land are overcrowded with weeds which together with the soil compression by the plowshare make progress of the machine difficult.

SUMMARY OF THE INVENTION

An object of the present invention is to obviate or mitigate these difficulties.

According to the present invention there is provided a mobile machine for uprooting endives and other tap roots comprising at least one immovable but adjustable uprooting plowshare and at least one spoked wheel forwardly of a conveyor belt, the machine being characterised in that it includes at least one uprooting unit constituted by a frame, carrying the plowshare, a disc transversely spaced from, the plowshare, and located rearwardly of the plowshare in the direction of movement of the machine, and the spoked wheel located alongside the disc and driven by a motor at a tangential speed greater than the travelling speed of the machine, the disc and/or spoked wheel being inclined in relation to the vertical to form a V.

With this machine, the soil is not compressed because the plowshare has only one vertical arm, the soil being displaced transversely first to one side, then to the other when it is held between the disc and the wheel, where it is entrained by a rotating movement which together with the action of the wheel spokes breaks down the clod of soil around the roots. The vertical pinching of the soil between the wheel and disc facilitates the lifting of soil and root, free from any compression, so that the intact root, still partially covered with soil, is delivered on to the conveyor belt, the remaining soil becoming loose and being detached from the root without any difficulty.

BRIEF DESCRIPTION OF THE DRAWINGS

An embodiment of the present invention will now be described, by way of example, with reference to the accompanying drawings, in which:

FIG. 2 is a sectional view on the line II—II of FIG. 1.

FIG. 3 is a sectional view on the line III—III of FIG. 1.

DESCRIPTION OF PREFERRED EMBODIMENT

Figure 1:
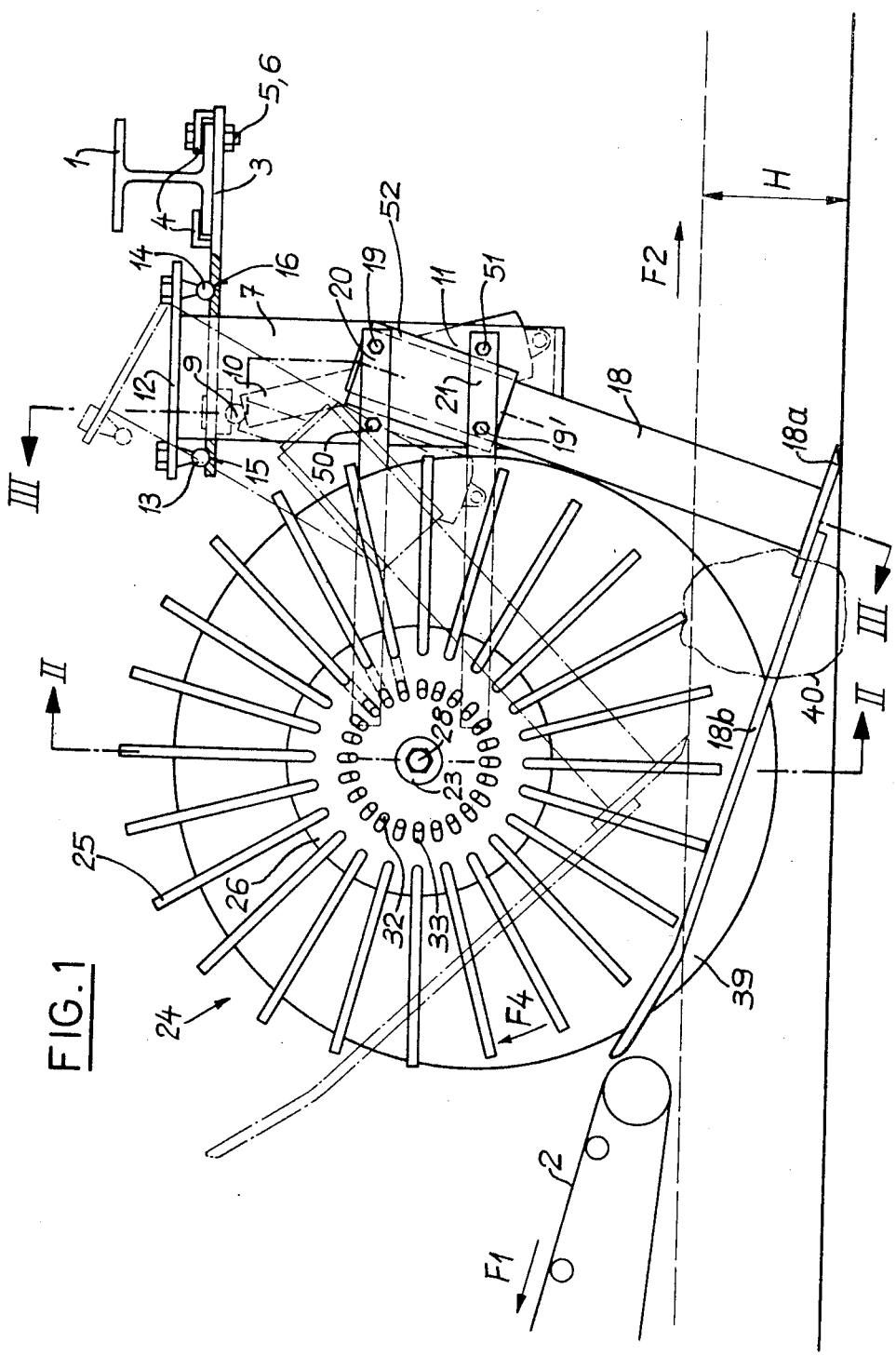
FIG. 1 is a side elevation of a machine having an uprooting unit according to the invention.

The uprooting unit shown in FIG. 1 is mounted on the frame of a harvesting machine, whereof only a horizontal cross member 1 and a movable conveyor belt 2 which moves in the direction of arrow F1 are shown.

On the cross member 1 is fixed a horizontal frame 3 by means of flanges 4 and bolts 5 and 6. On the fixed frame 3 is mounted a tiltable frame 7 which is supported on the fixed frame 3 by a swivel joint 9 located at the end of a piston 10 of a fluid cylinder 11 connected to a liquid nitrogen tank (not shown) providing a pressure source approximately from 100 to 150 atmospheres. The piston and cylinder device 10, 11 tends to maintain the frame 7 in the position shown in full lines, a position in which a cross plate 12 is supported by four swivel joints 13, 13' and 14, 14' in recesses 15 and 16 in the fixed frame 3. In the tilted position, shown in broken lines, the piston 10 is compressed and the frame 7 swivels on the joints 14 and 14'. FIG. 3 shows also that the cylinder 11 is mounted on a swivel joint 17 on the frame 7. Therefore, the fluid piston and cylinder 10, 11 serves as a resilient return means. Frame 7 carries, adjacent the bottom of one of its sides a preferably L-shaped ploughshare 18, obliquely attached to a tubular seat 52 integral with the frame 7 by bolts 19 and 19' which secure the plowshare 18 to the frame 7. By means of this securement the height of the plowshare may be adjusted. Also, the frame and plowshare may be more or less spaced by wedges so as to regulate its position laterally. The plowshare has a leading extension 18a and a rear oblique extension 18b. In the working position, the plowshare has an approximately 20° angle, preferably 18°, with the horizontal. Plowshare 18 which is a wearing part is easy to replace, in contrast to the usual plowshares, by simply unscrewing the bolts 19 and 19'.

On the same side of the frame 7 as the plowshare 18 are mounted two steel bars 20 and 21 secured at one end by the bolts 19 and 19' and bolts 50 and 51. These bars have a suitable bending elasticity in the horizontal direction and they support at their opposite end a hydraulic motor-reduction unit 22 (FIG. 2) which drives a boss 23 keyed to a driving shaft on which is mounted a spoked wheel 24 whereof the spokes 25 are free at their outer ends and are radial. Spokes 25 are attached at their inner ends to a dish-shaped disc 26, which, in turn, is secured to and centered on the boss 23 and secured in position by a screw 28. Each spoke 25 is secured to the boss disc by means of a single nut 29, each spoke 25 passing through an elongate hole 31 in the side of the disc 26, and having a cranked part extending through a second elongate hole 33. Thus, spokes 25 are held firmly on the disc 26. In addition, any broken spoke can be very easily and quickly replaced.

The other side of the frame 7 mounts two steel bars 34 and 35 identical to the bars 20 and 21, and which support a plate 36 on which is mounted a shaft 37 mounting, through a ball bearing, a boss 38 on which is secured a relatively thin steel disc 39. This disc 39 may, therefore, freely rotate on the shaft 37.

As shown in FIG. 2, the spoked wheel 24 and the disc 39 are slightly downwardly convergent to form vertically a V configuration. In addition, the spoked wheel 24 and the disc 39 are also convergent in the horizontal plane, i.e. they converge in the direction of the conveyor belt 2, and the axis of the disc 39 is slightly lower than the axis of the spoked wheel 24.

The motor-reduction unit 22 drives the spoked wheel 24 at a speed slightly higher than the forward travelling speed of the machine, so that the circular speed of the spoke wheel is equal to approximately 1.2 to 1.4 times the travelling speed.

Figure 4:
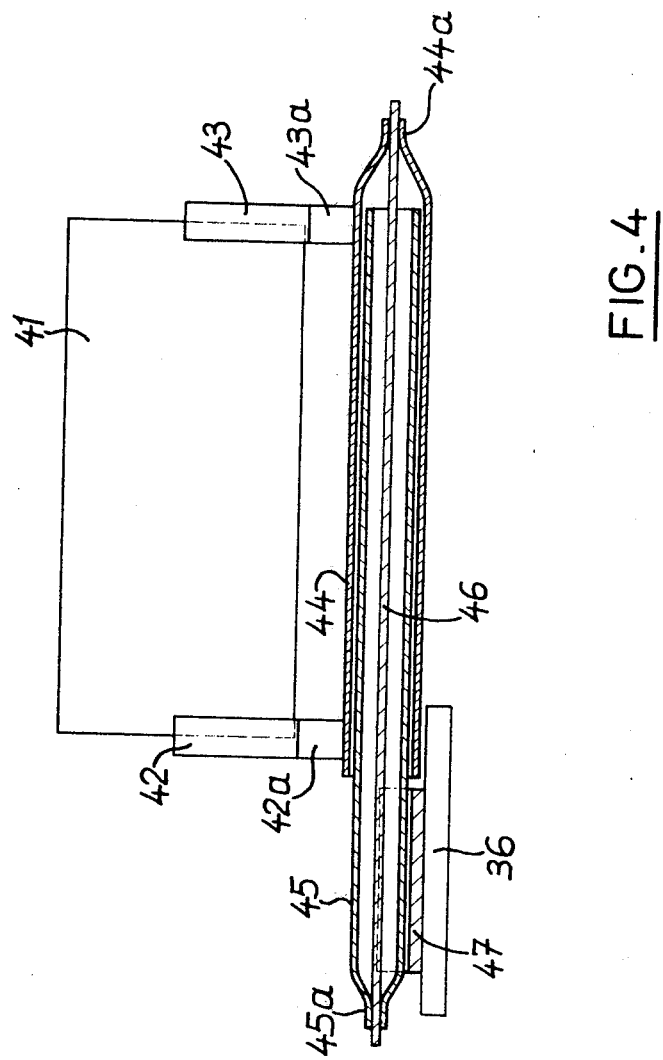
FIG. 4 is a part sectional plan view of a detail of FIG. 2.

Additionally, the plate 36 carries a scraper 41 which continuously cleans the disc 39. This scraper is constituted by a simple plate 41 freely engaged between the limbs of U-shaped members 42 and 43 (FIG. 4) with parts 42a and 43a flattened so as to form a support for the plate 41. Members 42 and 43 are welded to tube 44 in which a second tube 45 is freely engaged. The tube ends 44a and 45a are flattened upon a steel spring blade 46. The tube 45 is welded between the limbs of U-member 47 which in turn is welded to the plate 36. In the position shown in FIG. 2, spring blade 46 is slightly compressed to maintain the scraper 41 against the disc 39.

In a modification, the disc only is inclined. In this case, the horizontal axis of the spoked wheel enables several spoked wheels to be easily driven by a common motor. In another modification the disc 39 is also driven preferably at a speed other than that of the spoked wheel so as to increase the crushing effect which will be described later.

The machine operates as follows:

The machine is moved, for example, by a tractor in the direction of arrow F2. Plowshare 18 is driven into the soil at a working depth H, and leading part 18a lifts the soil while the lateral part tends to displace the soil laterally in the direction of arrow F3 (FIG. 3). This soil, finding no resistance, is displaced relatively easily. While the machine moves forwards, the displaced soil comes into contact with the lower edge of the disc 39, the disc 39 being rotated by rolling on the ground, at a depth less than H, and the soil is pushed away, in the direction opposite that shown by arrow F3, by the disc 39 against the spoked wheel 24, where the spokes, whose rotating speed is much faster than the travelling speed of the machine, drive the tap roots and soil clods covering the roots in the direction of arrow F4 (FIG. 1). The vertical convergence, and possibly the horizontal convergence, between the disc 39 and the spoked wheel 24 facilitates the lifting of the soil clods on to plowshare rear ramp 18b towards the conveyor belt 2. The soil is subjected, therefore, suddenly to a back and forth motion without being compressed since the soil is given a rotary movement between the disc 39 and the spoked wheel 24 owing to the difference in the rotating speeds of these two elements, while being disintegrated by the spoked wheel. These movements contribute to the disintegration of the clods of soil and the freeing of the endive root without damaging the root.

In addition, the vertical displacement between the spoked wheel axis and the disc axis give rise to an additional upward friction effect, thus improving breaking up of the soil.

Finally, due to the flexibility of the bars carrying the spoked wheel and the disc, it is possible for a stone of dimensions greater than the normal spacing between spoked wheel and the disc to pass between them.

The use of a tiltable frame 7 is not essential, but in a stony plot of ground reduces the risk of breakdown and assists in eliminating frequent stoppages.

FIG. 1 shows schematically a stone 40 of relatively considerable size against which plowshare 18 has come to rest. The resistance of this stone is such that the frame 7 is forced to tilt in the position shown by the dotted line the piston 10 being compressed. The forward movement of the machine is not stopped and as soon as the plowshare has passed stone 40, cylinder 11 automatically brings back the frame to the position shown in full lines.

In addition, it should be noted that bars 34 and 35 may be either attached to the interior or exterior of frame 7, with or without wedges, which enables the clearance between the disc and the spoked wheel to be modified.

As an alternative, and for uprooting beetroot, ploughshare 18 may consist of a simple stanchion, i.e. a straight plowshare.

What is claimed is:

1. A mobile machine for uprooting endives and other tap roots, comprising a frame, an uprooting plowshare carried by said frame, a rotatable disc spaced transversely from said plowshare and located rearwardly of the plowshare in the direction of movement of the machine, a rotatable spoked wheel located along side said disc, motor means for driving said spoked wheel at a speed different from that of said disc and a tangential speed greater than the travelling speed of the machine, at least one of said discs and said spoked wheel being inclined in relation to the vertical to form a V, said disc and spoked wheel cooperating to lift and free from dirt said roots uprooted by said plowshare, and conveying means receiving said roots from said disc and spoked wheel.

2. A mobile machine for uprooting endives and other tap roots, comprising a frame, an uprooting plowshare carried by said frame, a rotatable disc spaced transversely from said plowshare and located rearwardly of the plowshare in the direction of movement of the machine, a rotatable spoked wheel located alongside said disc, motor means for driving said spoked wheel at a tangential speed greater than the travelling speed of the machine, at least one of said disc and said spoked wheel being inclined in relation to the vertical to form a V, said disc and spoked wheel being mounted on said frame by laterally flexible bars, and conveying means receiving roots uprooted by said plowshare and lifted and freed of dirt by cooperation of said disc and said spoked wheel.

3. A machine according to claim 1 or 2, in which said motor means driving said spoked wheel is a motor attached to said frame, said motor together with said plowshare, said disc and said spoked wheel constituting a module mounted on said frame.

4. A machine according to claim 3, in which said module is tiltably mounted and maintained in the working position by a fluid piston and cylinder device.

5. A machine according to claim 1 or 2, in which said spoked wheel is substantially flat.

6. A machine according to claim 1 or 2, in which said plowshare comprises a fixed wearing piece which is height adjustable relative to said frame and which when viewed from the front is of L-shape and has a leading and a trailing part inclined, in the working position, at an angle between 15° and 20° to the horizontal.

7. A machine according to claim 1, in which a vertical angle formed between the disc plane and the spoked wheel plane is approximately 10°.

8. A machine according to claim 1 or 7, in which the disc plane and the spoked wheel plane converge in the direction of said conveying means.

9. A machine according to claim 1 in which said disc is freely rotatable on a shaft so as to be driven by the ground at the travelling speed of the machine.

10. A machine according to claim 1 in which the disc is rotated mechanically.

11. A machine according to claim 1 or 2, in which the spoked wheel is constituted by a central disc to which each spoke is attached by a cranked end passing through two successive holes on the disc, the cranked end being secured to the disc by a nut.

12. A machine according to claim 11, in which the holes are elongated and aligned in the direction of the spoke.

13. A machine according to claim 1, in which there is associated with said disc a resilient scraping device consisting of a scraping plate mounted on a tube freely mounted on a second tube, opposite ends of said tubes being flattened to grip a torsion bar.

14. A mobile machine for uprooting endives and other tap roots, comprising a frame, an uprooting plowshare carried by said frame, a rotatable disc spaced transversely from said plowshare and located rearwardly of the plowshare in the direction of the movement of the machine, said disc being freely rotatable on a shaft so as to be driven by the ground at the travelling speed of the machine, a rotatable spoked wheel located alongside said disc, motor means for driving said spoked wheel at a tangential speed greater than the travelling speed of the machine, at least one of said disc and said spoked wheel being inclined in relation to the vertical to form a V, and conveying means receiving roots uprooted by said plowshare and lifted and freed of dirt by cooperation of said disc and said spoked wheel.

15. A mobile machine for uprooting endives and other tap roots, comprising a frame, an uprooting plowshare carried by said frame, a rotatable disc spaced transversely from said plowshare and located rearwardly of the plowshare in the direction of movement of the machine, a rotatable spoked wheel located alongside said disc, motor means for driving said spoked wheel at a tangential speed greater than the travelling of speed of the machine, at least one of said disc and said spoked wheel being inclined in relation to the vertical to form a V and the axes of said spoked wheel and said disc being vertically displaced in relation to one another, and conveying means receiving roots uprooted by said plowshare and lifted and freed of dirt by cooperation of said disc and said spoked wheel.

16. A machine according to claim 15, in which said disc and said spoked wheel converge in the direction of said conveying means.

* * * * *